No. 883,064. PATENTED MAR. 24, 1908.
T. L. VALERIUS.
ICE CREAM FREEZER.
APPLICATION FILED JULY 28, 1906.
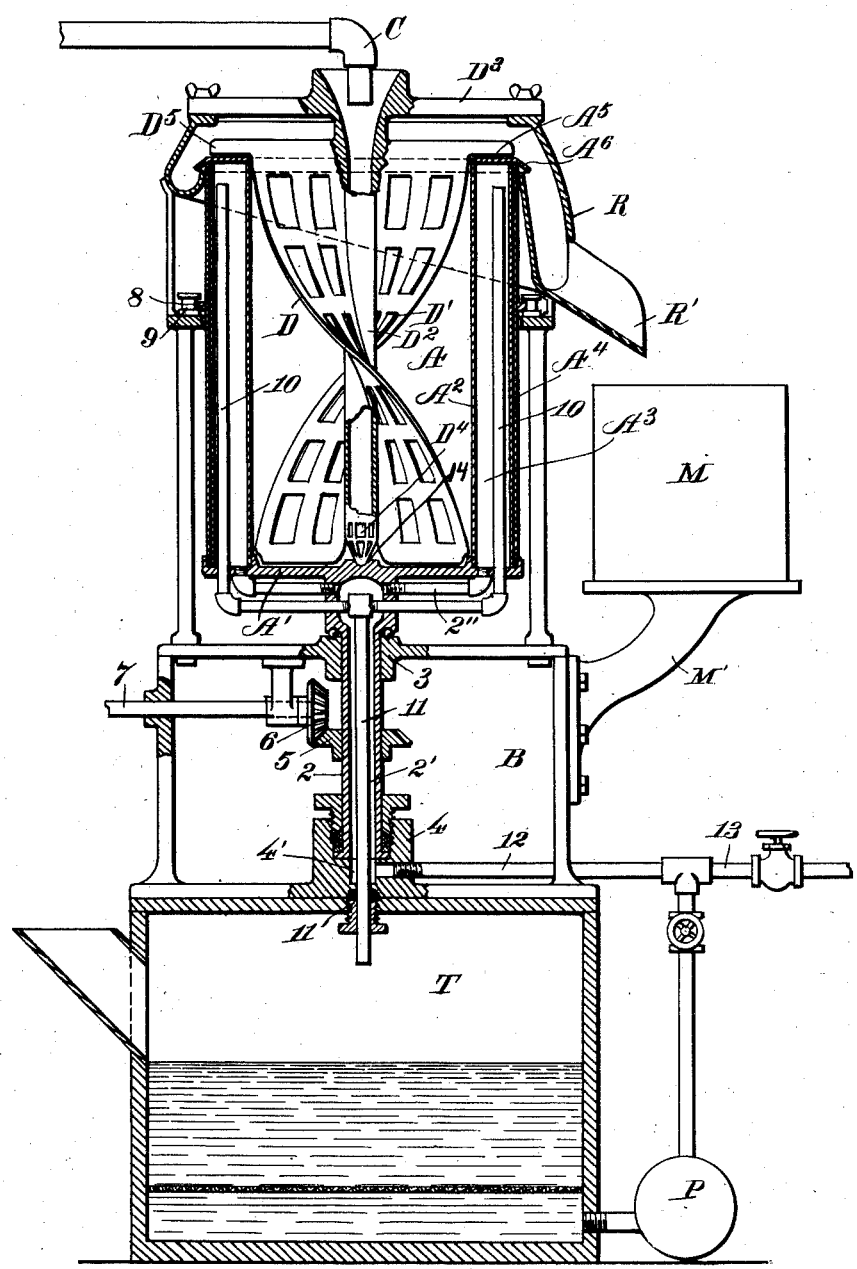
Witnesses:
Inventor,
Theodore L. Valerius,

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER.

No. 883,064.　　　Specification of Letters Patent.　　　Patented March 24, 1908.

Application filed July 28, 1906. Serial No. 328,222.

*To all whom it may concern:*

Be it known that I, THEODORE L. VALERIUS, a citizen of Fort Atkinson, county of Jefferson, and State of Wisconsin, have invented a certain new, useful, and Improved Ice-Cream Freezer, of which the following is a full, clear, and exact description, such as will enable others skilled in the art to which it appertains to make and use the same.

My invention relates to the art of manufacturing ice cream and the like and has special reference to improvements in ice cream freezers.

The primary object of my invention is to provide means whereby a liquid such as ice cream custard, may be reduced to a semi-frozen state for subsequent solidification in suitable storage vessels.

A further object of the invention is to provide apparatus whereby the process of freezing ice cream and the like may be carried on continuously.

Other and particular objects of the invention are, to reduce the cost of large capacity ice cream freezers, to reduce the labor of operating ice cream freezers, to reduce the power required for the operation of the apparatus, to make it easier to maintain the apparatus in sanitary condition, and to insure a gain in the volume of the product of the apparatus; all in comparison with present-day ice cream freezers.

My invention consists generally in an ice cream freezer comprising an externally cooled liquid vessel mounted for rotation upon a vertical axis, and open at the top, in combination with a reversely movable or stationary dasher provided within said vessel, and a means at the top of said vessel for receiving the semi-frozen liquid therefrom.

My invention also consists in various details of construction and in combinations of parts, all as hereinafter described, and particularly pointed out in the claims.

My invention will be more readily understood by reference to the accompanying drawings forming a part of this specification, and in which an ice cream freezer embodying my invention is shown in vertical, sectional elevation.

My novel ice cream freezer is of such construction that the operation of freezing ice cream or the like therein may be carried on continuously; that is, the "custard" is fed or supplied to the freezer in a continuous stream, and the freezer continuously discharges liquid in a semi-frozen condition. This freezer, may, therefore, be employed singly, or may be combined in tandem with others. In the latter case, the work of freezing the cream is done in stages, the same being initially chilled or refrigerated in the first machine, and finished in a second.

Referring to the drawings, A represents the freezer can or vessel; this is cylindrical in form, and is open at the top; the can is mounted upon a vertical shaft 2, held in bearings 3 and 4 in the base B. The shaft 2 is rotated by means of beveled gears 5 and 6 upon shaft 2 and the power shaft 7 respectively. The can is rotated at a slow speed. The ring 8 upon the upper part of the can engages a plurality of anti-friction rollers 9, fixed on the base or frame and serving to center the upper part of the can. It should be explained that these are not essential to the mechanism, provided shaft 2 is made sufficiently strong. The freezer can, as stated above, is cylindrical in form; its bottom is formed by the disk $A'$ on the upper end of the shaft 2; the inner wall $A^2$ of the can is of thin sheet metal, preferably tinned copper. This inner wall is surrounded by a jacket forming an annular space $A^3$, that is filled with brine or other refrigerant; the outer wall $A^4$ is composed of several thicknesses of sheet metal, including a cylinder of insulating material, the office of which is to prevent the absorption of heat by the external wall of the can. The brine jacket is closed at the top by an annular ring $A^5$; the edge of the ring projects to form a flange $A^6$, which overhangs the outer wall $A^4$ for the purpose hereinafter indicated. The brine is constantly circulated through the jacket $A^3$; as the can is in rotation it is necessary that the brine connections shall be revoluble. I meet the requirement by forming the shaft 2 as a tube and by providing the bearing 4 with a cavity $4'$ which is in communication with the duct $2'$ within the shaft. The brine passes upward through the shaft 2, and from the cavity in the upper end thereof is conducted to the bottom of the jacket or space $A^3$, by two short pipes or ducts $2''$. Overflow, or return pipes 10, arranged within the jacket or space $A^3$, extend from the top thereof, through the bottom of the jacket, and are connected with a pipe 11, axially arranged within the hollow shaft 2. This pipe, 11, extends through the lower end of the bearing 4. As the pipe 11 rotates in the bearing 4, a stuffing box 11' is preferably provided therein, to prevent leakage at the joint. The most convenient location for the brine tank T is directly beneath the freezer, as shown in the drawing. The pump P, connected with the bottom of the tank, and with the hollow bearing 4, through the medium of pipe 12, serves to maintain a constant circulation of brine through the brine jacket of the can. A steam pipe 13 is connected with the brine pipe 12 for the purpose of admitting steam to the jacket of the can when required to raise the temperature of the freezer to free the walls thereof from caked cream, or to sterilize the same after the can has been cleaned.

The dasher, D, of my machine is preferably stationary. It comprises two wings D', the edges of which closely approach the inner surface of the rotating can, to clear said surface of the freezing cream. The wings are cast or otherwise secured upon a hollow stem $D^2$. The lower end of the stem is seated in a socket 14, provided for it in the bottom of the can, and the upper end of the stem is held by two arms $D^3$ which are secured upon the stationary frame of the machine. The custard to be frozen flows into the upper end of the hollow stem $D^2$, and descends therethrough, entering the bottom of the can through perforations $D^4$ in the lower end of the stem. It will be noted that the wings D' are provided with top scrapers or lugs $D^5$, which serve to clear the top or upper edge of the can.

As will be better understood from the description of the operation of my machine, which follows: the semi-frozen liquid is discharged over the upper edge or rim of the can. It is received by the annular cup or hollow ring R, which surrounds the upper end of the can, underlying the projecting flange $A^6$. Said ring forms a part of the stationary frame of the machine; its bottom is inclined and the ice cream which falls into the ring is discharged therefrom through a spout R', arranged at its lowermost point. The spout R' may deliver the partially frozen liquid to another freezer, or to a packing can or mold M, which rests upon a bracket M' attached to the base of the machine.

If it is found that the agitation to which the cream is subjected is insufficient to increase adequately the volume of the frozen product, compressed air may be blown into the lower part of the freezer. To this end I sometimes employ a small air-pipe, which extends to the lower end of the hollow stem of the dasher.

The operation of the described ice cream freezer is as follows: A quantity of cold brine having been prepared in the tank T, the pump is set into operation to circulate the brine through the jacket of the freezer can. The brine rises into the jacket through the hollow shaft 2 and the pipes 2'', and returns to the tank through the pipes 10, 11, leading from the top of the jacket. The can is then placed in rotation and a supply of custard is admitted from the nozzle or pipe C. Contact with the cold walls of the freezer can, and the continuous agitation produced by the rotation of the can, coupled with the interference of the dasher, causes the custard to congeal, and as the custard continues to enter the vessel the lighter frozen portions rise to the top of the can. From thence the semi-frozen liquid is discharged across the upper part of the can, and falls into the receiver or hollow ring R. The degree to which the liquid will be frozen depends upon the speed with which the can is rotated, the efficiency of the brine circulation, and the quantity of custard which is fed to the can. The fresh custard, entering the lower part of the can, serves to float or lift the frozen cream, hence, the greater the supply of custard, the more rapid will be the discharge of the partially frozen liquid at the top of the can. From these facts, it will be obvious that the cream may be delivered from the machine in any desired state or condition.

As various modifications of my invention will readily suggest themselves to one skilled in the art, I do not confine the invention to the specific structure herein shown and described.

Having thus described my invention, I claim as new, and desire to secure by Letters Patent

1. In an ice cream freezer, an externally cooled cylindrical freezing vessel mounted for rotation upon a vertical axis and open at the top, in combination with stirring and scraping means extending downward through the open top of said vessel, means for supplying freezing fluid to the walls of said vessel, and an annular receiver surrounding the upper end of said vessel to receive partially frozen ice cream from the rim or upper edge thereof.

2. In an ice cream freezer, an externally cooled cylindrical freezing vessel mounted for rotation upon a vertical axis and open at the top, being provided with an outwardly flared upper edge or rim, in combination with means for supplying freezing fluid to the walls of said vessel, stirring and scraping means arranged in said vessel to clear its walls and agitate its contents, and means continuously operating to clear the rim of said vessel.

3. In an ice cream freezer, an externally cooled cylindrical freezing vessel mounted for rotation upon a vertical axis and provided with an outwardly turned or flared upper edge or rim, in combination with means for supplying freezing fluid to the walls of said vessel, means for supplying the liquid to be frozen, scraping and agitating means within said vessel, a rim scraper, and an annular receiver into which the semi-frozen liquid is discharged from said rim, substantially as described.

4. In an ice cream freezer, an externally cooled cylindrical freezing vessel mounted for rotation upon a vertical axis and having an outwardly turned or flared upper edge or rim, in combination with a dasher and scraper within said vessel and stationary means at the rim of the vessel for receiving and discharging the semi-frozen liquid therefrom, substantially as described.

5. In an ice cream freezer a cylindrical freezing vessel having a hollow wall and provided with an outwardly flared upper edge or rim, in combination with means for rotating said vessel upon its vertical axis, means for circulating freezing fluid in the hollow wall of the vessel while the latter is in rotation, a dasher in said vessel, and means at the top of the vessel to receive semi-frozen liquid from the rim thereof, substantially as described.

6. In an ice cream freezer, a cylindrical vessel, provided with an insulated outer wall and a heat conducting inner wall, separated by a liquid space, in combination with means for rotating said vessel upon its vertical axis, means for circulating a freezing liquid in the space between the walls of said vessel, a dasher within said vessel, and means at the top of said vessel for continuously supplying liquid thereto and discharging liquid therefrom, substantially as described.

7. In an ice cream freezer, a cylindrical vessel, provided with an insulated outer wall and a heat conducting inner wall, separated by a liquid space, in combination with means for rotating said vessel upon its vertical axis, means for circulating a freezing liquid in the space between the walls of said vessel, a dasher within said vessel, means for continuously supplying custard to said vessel, and means at the top thereof for continuously discharging semi-frozen liquid therefrom, substantially as described.

8. In an ice cream freezer, a cylindrical vessel, provided with an insulated outer wall and a heat conducting inner wall, separated by a liquid space, in combination with means for rotating said vessel upon its vertical axis, means for circulating a freezing liquid in the space between the walls of said vessel, a dasher within said vessel, means for supplying custard to said vessel and an annular receiver surrounding the upper part of the said vessel, as and for the purpose specified.

9. In an ice cream freezer, a cylindrical freezing vessel having hollow walls and open at the top, in combination with means for rotating said vessel upon its axis, means for circulating freezing fluid in the walls of the vessel, a central custard inlet pipe extending to the bottom of the vessel, a dasher thereon, and means at the top of the vessel for receiving semi-frozen liquid therefrom, substantially as described.

10. In an ice cream freezer, a double walled cylindrical freezing vessel, mounted for rotation upon its vertical axis, in combination with a dasher provided in said vessel, means at the top of the vessel for receiving and discharging semi-frozen liquid therefrom, means for supplying custard to the vessel, means for circulating frozen liquid in the walls of said vessel during the rotation thereof, and the outer wall of said vessel being externally insulated, substantially as described.

11. In an ice cream freezer, an externally insulated double walled can mounted for rotation on a vertical axis and open at the top, in combination with means for circulating freezing liquid in the space between the walls of said can while the same is in rotation, means for rotating said can, a central custard inlet pipe or duct, a dasher, and peripheral receiving means at the top of said can, substantially as described.

12. In an ice cream freezer, an externally cooled can open at the top and mounted for rotation on a vertical axis, a dasher, a central custard inlet pipe or duct, an annular flange at the top of said can, and an annular receiver for the semi-frozen liquid underlying said flange, substantially as described.

13. In an ice cream freezer, an externally cooled can open at the top and mounted for rotation on a vertical axis, a dasher, a central custard inlet pipe or duct, an annular flange at the top of said can, and an annular receiver for the semifrozen liquid underlying said flange, said annular receiver having an inclined bottom and a discharge spout, substantially as described.

14. In an ice cream freezer, an externally cooled can mounted for rotation upon a vertical axis and open at the top, in combination with means for rotating said can, a central custard inlet pipe or duct, a dasher, an annular receiving trough surrounding the upper part of said can beneath the rim thereof and adapted to receive the semi-frozen liquid from the rim of said can, substantially as described.

15. In an ice cream freezer, an externally cooled can mounted for rotation upon a vertical axis and open at the top, in combination with means for rotating said can, a central custard inlet pipe or duct, a dasher, an annular receiving trough surrounding the upper part of said can beneath the rim thereof and means upon said dasher for discharging the semi-frozen cream from the rim of the can into said trough, substantially as described.

16. In an ice cream freezer, an open topped freezing can in combination with a dasher therein, said can and dasher being relatively revoluble, means for refrigerating the contents of said can, an annular trough surrounding the upper portion of said can beneath the rim thereof and means for clearing the rim of the can to discharge semi-frozen liquid from said rim into said trough, substantially as described.

In testimony whereof, I have hereunto set my hand, this 25th day of July, 1906, in the presence of two subscribing witnesses.

THEODORE L. VALERIUS.

Witnesses:
   IRVING R. HIPPENMEYER,
   SANFORD P. STARKS.